(12) United States Patent
Sebire (10) Patent No.: US 6,870,858 B1
(45) Date of Patent: Mar. 22, 2005

(54) TRAINING SEQUENCE BASED SIGNALLING FOR ENHANCED GENERAL PACKET RADIO SERVICE (EGPRS)

(75) Inventor: Guillaume Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/570,102

(22) Filed: May 12, 2000

(51) Int. Cl.[7] ............................................. H04J 3/06
(52) U.S. Cl. ..................... 370/514; 370/527; 370/529
(58) Field of Search ................................ 370/503, 509, 370/329, 336, 341, 522, 514, 527, 529; 375/150, 231, 354, 368, 141, 142, 143, 144; 455/422, 466

(56) References Cited

U.S. PATENT DOCUMENTS

| | | | | |
|---|---|---|---|---|
| 5,303,226 A | * | 4/1994 | Okanoue et al. | 370/442 |
| 5,448,571 A | * | 9/1995 | Hong et al. | 370/514 |
| 5,533,066 A | * | 7/1996 | Yamaguchi et al. | 375/341 |
| 5,642,354 A | * | 6/1997 | Spear | 370/329 |
| 6,111,910 A | * | 8/2000 | Cui et al. | 375/142 |
| 6,185,227 B1 | * | 2/2001 | Sipola | 370/522 |
| 6,282,182 B1 | * | 8/2001 | Pecen et al. | 370/336 |
| 6,304,750 B1 | * | 10/2001 | Rashid-Farrokhi et al. | 455/137 |
| 6,473,506 B1 | * | 10/2002 | Hook et al. | 379/279 |
| 6,532,225 B1 | * | 3/2003 | Chang et al. | 370/341 |
| 6,546,026 B1 | * | 4/2003 | Goeddel | 370/513 |
| 6,621,855 B1 | * | 9/2003 | Van Stralen et al. | 375/142 |

FOREIGN PATENT DOCUMENTS

| | | |
|---|---|---|
| EP | 1063806 A2 | 12/2000 |
| WO | WO00/05844 | 2/2000 |

OTHER PUBLICATIONS

Schramm et al. "Radio Interface Performance of EDGE, a Proposal for Enhanced Data Rates in Existing Digital Cellular Systems" VTC'98, 48th, IEEE, 1998.
Uplink TBF Establishment for EGPRS in ETSI SMG2 Working Session on EDGE, May 17th –19th, 1999, Source: Ericsson, Tdoc SMG2 EDGE 134/99.

* cited by examiner

Primary Examiner—Ajit Patel
(74) Attorney, Agent, or Firm—Harrington & Smith, LLP (57) ABSTRACT

A method increases the wireless information carrying capability of a single bit-limited message by providing a plurality of different training sequences TS, such as a conventional 41 bit TS and two new 41-bit TSs, each with low cross-correlation and high auto-correlation. One of the TSs is selected, appended to an 11-bit Packet Channel Request message, and transmitted. The message with TS is detected and the message is interpreted in light of the TS. In EGPRS, selection of TS1 indicates one of a one-phase access request (OPAR), a short access request (SAR), or a two-phase access request (TPAR) with 8-PSK modulation capability on the uplink. Selection of TS2 indicates one of OPAR, SAR, or TPAR with GMSK modulation capability only on the uplink. Selection of TS_GSM indicates one of GPRS, OPAR, SAR or TPAR, or one of a page response, cell update, mobility management procedure, or a single block without a TBF establishment message.

10 Claims, 8 Drawing Sheets

| 11 | 10 | 9 | 8 | 7 | 6 | 5 | 4 | 3 | 2 | 1 | |
|---|---|---|---|---|---|---|---|---|---|---|---|
| 0 | m | m | m | m | m | p | p | r | r | r | ONE PHASE ACCESS REQUEST (OPAR) |
| 1 | 0 | 0 | n | n | n | p | p | r | r | r | SHORT ACCESS REQUEST (SAR) |
| 1 | 1 | 0 | 0 | 0 | 0 | p | p | r | r | r | TWO PHASE ACCESS REQUEST (TPAR) |
| 1 | 1 | 0 | 0 | 0 | 1 | p | p | r | r | r | PAGE RESPONSE |
| 1 | 1 | 0 | 0 | 1 | 0 | p | p | r | r | r | CELL UPDATE |
| 1 | 1 | 0 | 0 | 1 | 1 | p | p | r | r | r | MOBILITY MANAGEMENT PROCEDURE |
| 1 | 1 | 0 | 1 | 0 | 0 | r | r | r | r | r | SINGLE BLOCK WITHOUT TBF ESTABLISHMENT |

WITH: m: MS MULTISLOT CLASS (29 CLASSES: 5 BITS)
      p: RADIO PRIORITY (4 PRIORITIES: 2 BITS)
      n: NUMBER OF RLC DATA BLOCKS REQUESTED DURING A MOBILE
         ORIGINATED TBF (8 MAX: 3 BITS)
      r: RANDOM REFERENCE (UNFORMATTED FIELD)

FIG.1
PRIOR ART

| TRAINING SEQUENCE | 11 | 10 | 9 | 8 | 7 | 6 | 5 | 4 | 3 | 2 | 1 | |
|---|---|---|---|---|---|---|---|---|---|---|---|---|
| TS GSM | 0 | m | m | m | m | m | p | p | r | r | r | GPRS OPAR |
| TS1 | 0 | m | m | m | m | m | p | p | r | r | r | EGPRS OPAR: UL 8PSK CAPABLE |
| TS2 | 0 | m | m | m | m | m | p | p | r | r | r | EGPRS OPAR: UL GMSK ONLY |
| TS GSM | 1 | 0 | 0 | n | n | n | p | p | r | r | r | GPRS SAR |
| TS1 | 1 | 0 | 0 | n | n | n | p | p | r | r | r | EGPRS SAR: UL 8PSK CAPABLE |
| TS2 | 1 | 0 | 0 | n | n | n | p | p | r | r | r | EGPRS SAR: UL GMSK ONLY |
| TS GSM | 1 | 1 | 0 | 0 | 0 | 0 | p | p | r | r | r | GPRS TPAR |
| TS1 | 1 | 1 | 0 | 0 | 0 | 0 | p | p | r | r | r | EGPRS TPAR: UL 8PSK CAPABLE |
| TS2 | 1 | 1 | 0 | 0 | 0 | 1 | p | p | r | r | r | EGPRS TPAR: UL GMSK ONLY |
| TS GSM | 1 | 1 | 0 | 0 | 1 | 1 | p | p | r | r | r | PAGE RESPONSE |
| TS GSM | 1 | 1 | 0 | 1 | 1 | 0 | p | p | r | r | r | CELL UPDATE |
| TS GSM | 1 | 1 | 0 | 1 | 0 | 1 | p | p | r | r | r | MOBILITY MANAGEMENT PROCEDURE |
| TS GSM | 1 | 1 | 1 | 0 | 0 | 0 | r | r | r | r | r | SINGLE BLOCK WITHOUT TBF ESTABLISHMENT |
| REMAINING FREE TRAINING SEQUENCE/BIT PATTERN COMBINATIONS: RESERVED | | | | | | | | | | | | FUTURE USE |

TRAINING SEQUENCE BASED SIGNALLING FOR ENHANCED GENERAL PACKET RADIO SERVICE (EGPRS)

FIELD OF THE INVENTION

This invention relates generally to mobile equipment, such as radio telephones, cellular telephones and personal communicators, also known generally as wireless terminals and as mobile stations, and, more particularly, to methods and apparatus for providing packet data services for mobile equipment.

BACKGROUND OF THE INVENTION

Modern wireless telecommunications systems are evolving to provide high speed packet data services for users of mobile equipment. One example is an ability to provide internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Services).

Figure 1:
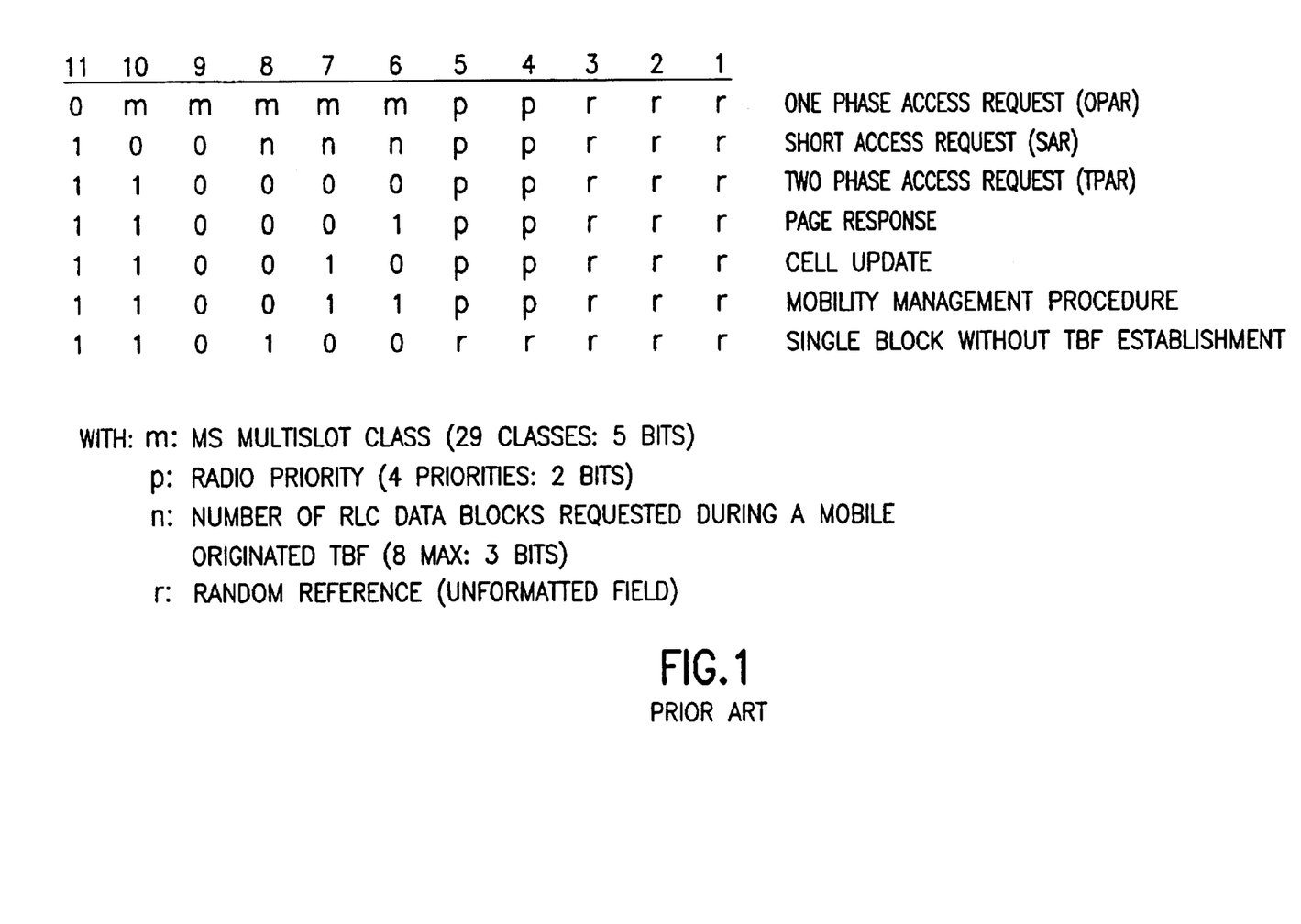
FIG. 1 is a table depicting the conventional GPRS Packet Channel Request message.

In EGPRS the same access types as in GPRS are supported to establish a so-called temporary block flow (TBF) in the uplink direction (i.e., from the mobile equipment to the network). To accomplish this, a control message used by a GPRS mobile equipment to request a packet channel (Packet Channel Request, 11 bits) is re-used for EGPRS. FIG. 1 illustrates the format of the conventional GPRS 11-bit Packet Channel Request message.

The Packet Channel Request message indicates what type of access the mobile station requires. The different access types that can be used when establishing an EGPRS connection are as follows.

(A) One Phase Access Request (OPAR)

OPAR is the fasted and most effective way of TBF establishment. However, setting up a TBF in EGPRS mode does not automatically imply that the mobile equipment use coherent 8-PSK modulation on the uplink. In fact, the network can order the mobile equipment to use any type of modulation, including Gaussian Mean Shift Keying (GMSK) based modulation schemes.

(B) Short Access Request (SAR)

SAR is employed when a small number of Radio Link Control (RLC) blocks (<=8) need to be transmitted. It is possible to include an EGPRS SAR, however the gain is considered to be low when compared to the standard GPRS SAR.

(C) Two Phase Access Request (TPAR)

TPAR requires more signalling than OPAR and SAR before the TBF is actually set up.

The 11 bits of the Packet Channel Request message permit the indication of 2048 different bit patterns, among which GPRS already uses 1024 for OPAR, 256 for SAR and a total of 160 for the others (TPAR, as well as page response, cell update, mobility management procedure and single block without TBF establishment). This results in only 608 available bit pattern combinations for EGPRS and future enhancements, which is clearly not sufficient.

For EGPRS it has been proposed that the 11-bit Packet Channel Request Message be modified to accommodate the uplink modulation and multislot requirements (ETSI SMG2 Working Session on Edge, Tdoc SMG2 EDGE 134/99, "Uplink TBF Establishment for EGPRS", Ericsson, May $17^{th}$–$9^{th}$, 1999, Bois d'Arcy, France.

This approach is generally not adequate, as it requires that further changes and assumptions be made to and in the packet radio service signalling protocols.

OBJECTS AND ADVANTAGES OF THE INVENTION

It is a first object and advantage of this invention to provide an improved technique for extending the quantity of information that can be transmitted from the mobile equipment to the wireless network using the 11-bit Packet Channel Request message, so as to accommodate the requirements of EGPRS and future enhancements to EGPRS.

It is a further object and advantage of this invention to provide a mobile equipment-based signalling technique that extends the information carrying capability of a single bit-limited message, such as the Packet Channel Request message, by providing a plurality of different training sequences selected to have low cross-correlation and high auto-correlation properties, wherein the message bits are interpreted differently depending upon the particular training sequence that is transmitted with the message.

SUMMARY OF THE INVENTION

The foregoing and other problems are overcome and the objects of the invention are realized by methods and apparatus in accordance with embodiments of this invention.

A method is disclosed for operating a mobile equipment (ME) in a wireless network, the method having steps of (A) providing a mobile equipment-based signalling technique that extends an information carrying capability of a single bit-limited message by providing a plurality of different training sequences selected to have low cross-correlation and high auto-correlation properties; (B) selecting one of the plurality of training sequences and setting bits of the message in accordance with information to be conveyed from the mobile equipment; (C) transmitting the message, including the training sequence, from the mobile equipment to a receiver; and (D) detecting the information conveyed by the message based on an interpretation of the message bits in accordance with the particular training sequence that is received with the message.

In the presently preferred embodiment of this invention the message is an 11-bit Packet Channel Request message, the training sequences include a conventional 41-bit GSM training sequence and two newly defined 41-bit training sequences, and the mobile equipment is operable for Enhanced General Packet Radio System (EGPRS) service.

In a presently preferred, but not limiting, embodiment of this invention a selection of TS1 indicates one of an EGPRS One Phase Access Request (OPAR), an EGPRS Short Access Request (SAR), or an EGPRS Two Phase Access Request (TPAR) with 8-PSK modulation capability on the uplink; a selection of TS2 indicates one of EGPRS OPAR, SAR, or TPAR with GMSK modulation capability only on the uplink; and a selection of TS_GSM indicates one of GPRS OPAR, SAR or TPAR, or one of a Page Response, Cell Update, Mobility Management Procedure, or Single Block without Temporary Block Flow (TBF) Establishment message content.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention grows out of an appreciation by the inventor that the existing bit-limited Packet Channel Request message is insufficient for encoding the additional information requirements of EGPRS-capable mobile equipment, as well as mobile equipment that will be compatible with future enhancements to EGPRS.

Figure 12:
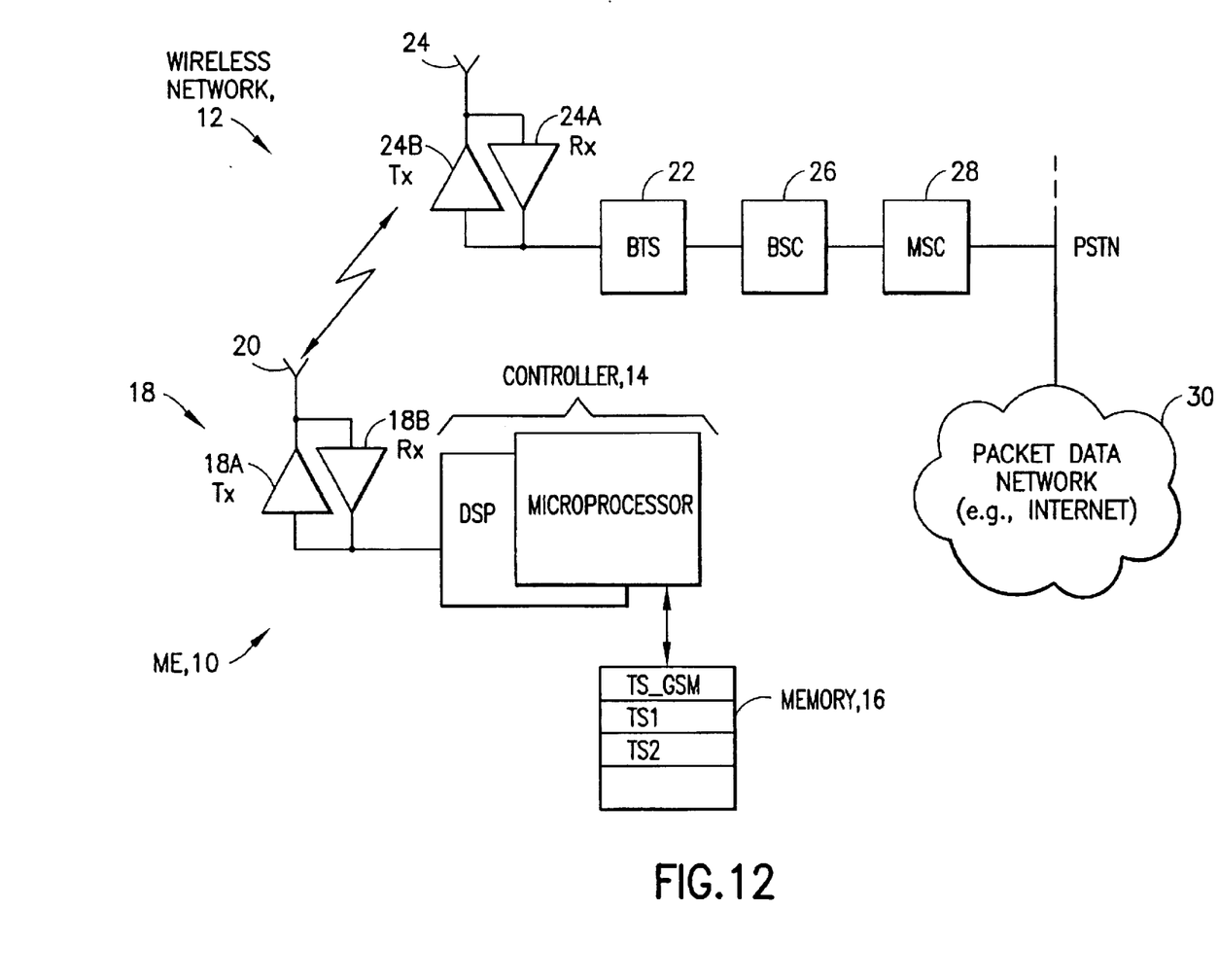
FIG. 12 is block diagram of a mobile equipment located within a cell of a wireless network that is suitable for practicing this invention.

Referring first to FIG. 12, there is shown a simplified block diagram of a mobile equipment (ME) 10 located within a cell of a wireless network 12. The ME 10 and the wireless network 12 are suitable, but not limiting, embodiments for practicing this invention. The ME 10 includes a controller 14, such as a combination of a microprocessor and a digital signal processor (DSP), that is used for controlling the overall operation of the ME 10 and for processing signals before transmission and subsequent to reception. For the purposes of this invention it is assumed the controller 14 is suitably programmed for requesting a packet channel and for transmitting data to the packet channel, as described in further detail below. A memory 16 is bidirectionally coupled to the controller 14, and stores, among other things, a plurality of training sequences, such as the conventional GSM training sequence (TS_GSM), as well as additional training sequences (e.g., TS1 and TS2). In accordance with an aspect of the teachings herein, these training sequences are employed when transmitting a Packet Channel Request message to the wireless network 12, and extend the information-carrying capacity of the Packet Channel Request message. The Packet Channel Request message is sent to the wireless network 12 through a transmitter 18A and antenna 20 of a wireless transceiver 18, and responses and downlink packet data are received through the antenna 20 and a receiver 18B of the transceiver 18. In general, packet data and other data, such as voice data (if the ME 10 includes voice capability) and signalling data all pass through the transceiver 18.

The wireless network 12 includes at least one base transceiver station (BTS) 22 having an antenna 24 coupled to a receiver 24A and a transmitter 24B. The antenna 24 may define the center of a serving cell within which the ME 10 is assumed to be located. In a GSM system the serving cell may have a radius of up to, for example, 35 km. Coupled to the BTS 22 is a base station controller (BSC) 26, which in turn is coupled to a mobile switching center (MSC) 28 or some other suitable interface to landline trunks, such as the public switched telephone network (PSTN) and/or one or more packet data networks 30. The packet data network 30 can include the internet, and may operate with TCP/IP protocols. Other types of packet data networks, such as intranets, can also be provided.

The training sequences, also referred to as synchronization sequences, are generally used by the wireless network receiver 24A for synchronization and channel estimation purposes.

Figure 2:
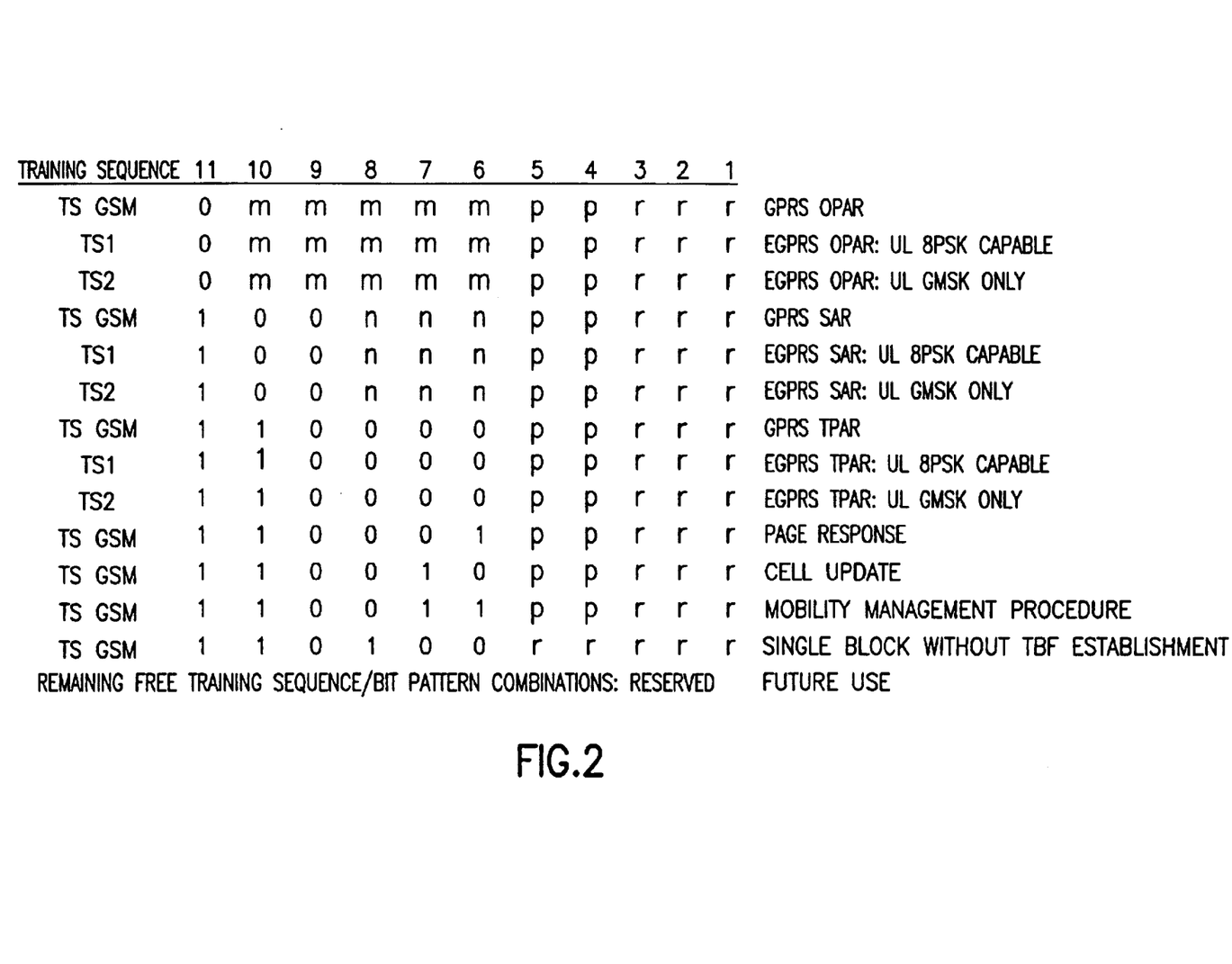
FIG. 2 is a table depicting the improved Packet Channel Request message that conveys different information as a function of the training sequence transmitted with the message, wherein m, p, n and r have the same meanings as in FIG. 1.

Referring now to FIG. 2 for the improved Packet Channel Request message format in accordance with the teachings herein, the synchronization or training sequence (TS, e.g., TS GSM, TS1, TS2) that is inserted in the Packet Channel Request message is used to signal both the EGPRS state and the uplink modulation capability of the mobile equipment 10. Note is made of the fact that the Packet Channel Request is sent on the Packet Random Access Channel (PRACH) on an Access Burst (AB). Each AB contains a synchronization/training sequence of size 41 bits. Reference in this regard can be generally had to ETSI GSM 05.02: "Multiplexing and Multiple Access on the Radio Path".

What is required to be signalled for EGPRS is one of: (A) EGPRS with ME 10 8-PSK capability on the uplink; or (B) EGPRS without ME 10 8-PSK capability on the uplink, i.e., the ME 10 is capable of using only GMSK modulation on the uplink.

For this case then TS1 and TS2 are defined and used, with TS1 indicating condition A, i.e., 8-PSK capability on the uplink, while TS2 indicates condition B, i.e., no 8-PSK capability on the uplink. The normal GSM training sequence (TS GSM) is employed to indicate the conventional GPRS OPAR, SAR or TPAR, as well as the conventional Page Response, Cell Update, Mobility Management Procedure, and Single Block without TBF Establishment message content.

The current GSM training (synchronization) sequence, with 41 bits in the PRACH AS, is as follows (see ETSI GSM 05.02: "Multiplexing and multiple Access on the Radio Path"):
TS_GSM:
(0,1,0,0,1,0,1,1,0,1,1,1,1,1,1,1,1,0,0,1,1,0,0,1,1,0,1,0, 1,0,1, 0,0,0,1,1,1,1,0,0,0).

The two new training sequences, in accordance with the teachings of this invention, are defined as follows:

TS1:
(0,1,0,1,0,1,0,0,1,1,1,1,1,0,0,0,1,0,0,0,0,1,1,0,0,0,1,0, 1,1,1, 1,0,0,1,0,0,1,1,0,1)

TS2:
(1,1,1,1,0,1,1,1,1,0,0,1,0,0,1,1,1,0,1,0,1,0,1,1,0,0,0,0,0, 1,1, 0,1,1,0,1,1,1,0,1,1,1)

These training sequences are selected to have low cross-correlation and high auto-correlation properties. Of course, the teachings of this invention are not limited to the use of only these particular bit patterns, nor to the use of training sequences having only 41 bits, nor to the use of three total training sequences, as in some embodiments two training sequences could be used, or four or more training sequences could be used.

The graphs of FIG. 3-11 show a performance evaluation of the use of these training sequences for the following criteria: detection probability, message error rate (MER), and false detection rate (FDR). Unless explicitly stated, the operation used to identify the transmitted training sequence employs a simple power-based detection technique. Some of the results were obtained with a slight improvement to the power-based detection technique by using a threshold to differentiate between correlation peaks. As is conventional, a TU3 propagation channel is one that represents a Typical Urban environment, in which the mobile equipment is moving at a speed of 3 km/h, while a HT100 propagation channel is one that represents a Hilly Terrain environment, in which the mobile equipment is moving at a speed of 100 km/h.

Figure 3:
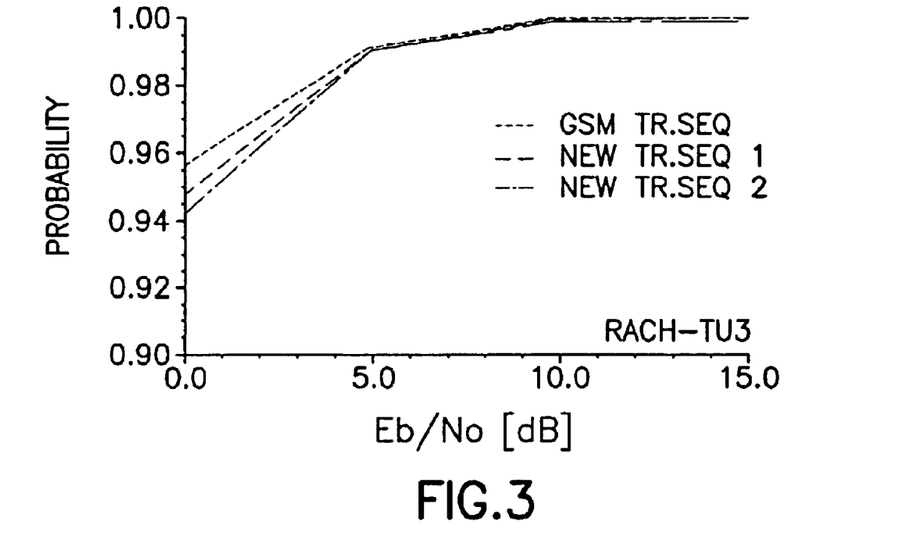
FIG. 3 is a graph showing a simulation of the detection probability of the plurality of training sequences in the presence of White Gaussian Noise (WGN), assuming a TU3 channel.

For example, FIG. 3 shows the detection probability for each of the training sequences (GSM, 1 and 2) in a TU3 channel. The wireless network receiver does not, of course, know the identity of the training sequence in advance, and processes the received sequence using the simple power-based detection technique.

As is evident in FIG. 3 for the white Gaussian noise case, the training sequences 1 and 2 are only slightly worse (less than 2%) in terms of detection probability, in the range of 0–5 dB SNR, otherwise the same performance as that obtained for the conventional GSM training sequence is achieved.

Figure 4:
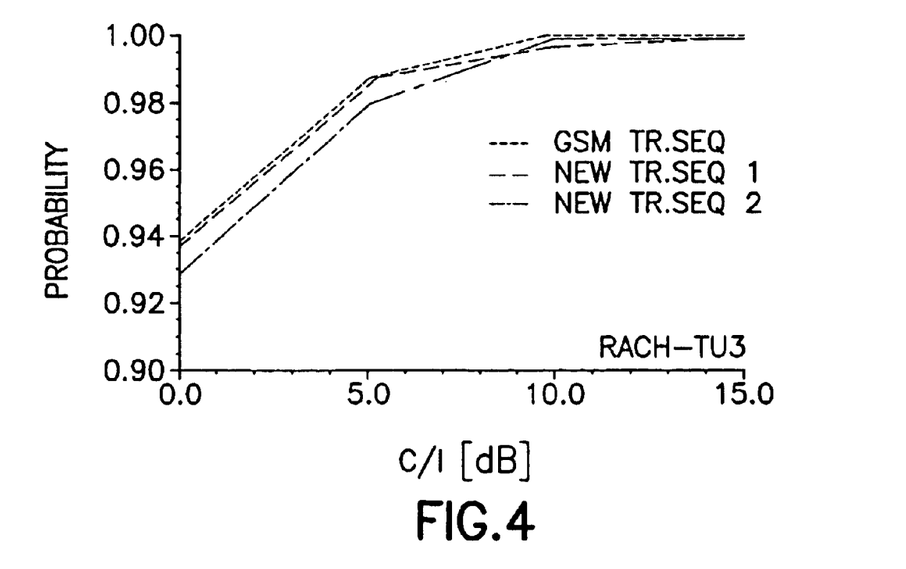
FIG. 4 is a graph showing a simulation of the detection probability of the plurality of training sequences in the presence of one single interferer, assuming the TU3 channel.

As is evident in FIG. 4 for the single interferer case, the second training sequence (TS2) is just slightly worse (less than 1%) than TS GSM and TS1 in terms of detection probability.

Figures 5, 6:
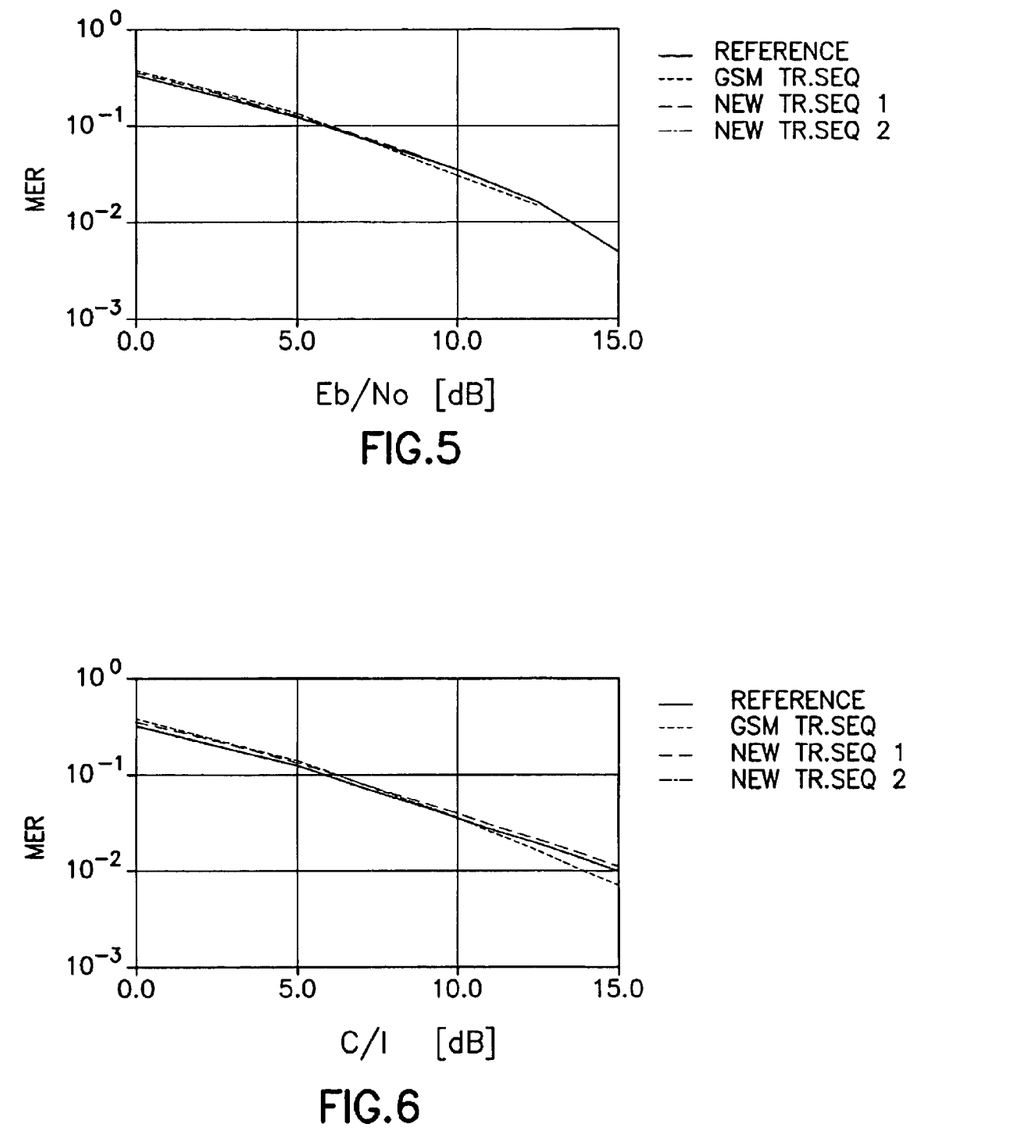
FIG. 5 is a graph showing a simulation of the message error rate for the plurality of training sequences in the presence of White Gaussian Noise (WGN), assuming the TU3 channel.
FIG. 6 is a graph showing a simulation of the message error rate for the plurality of training sequences in the presence of one single interferer, assuming the TU3 channel.
Figure 7:
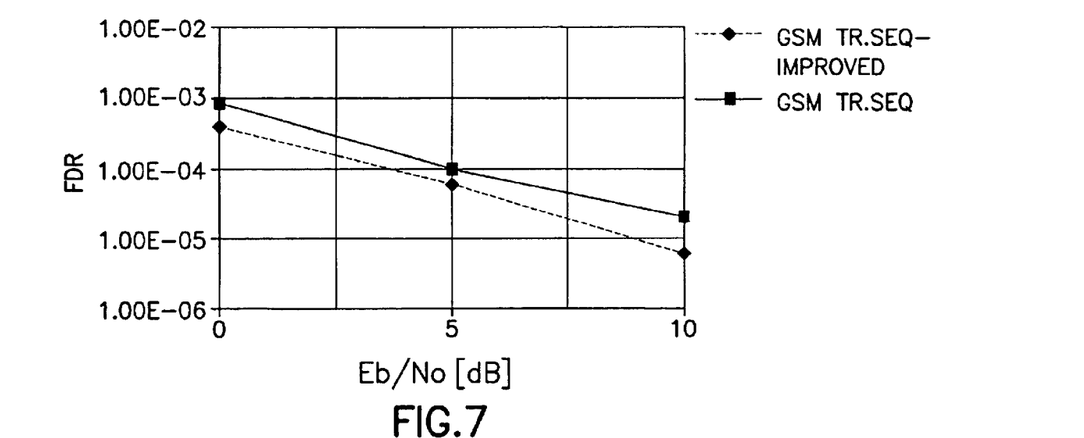
FIG. 7 is a graph showing a simulation of the false detection rate for the plurality of training sequences in the presence of White Gaussian Noise (WGN), assuming the TU3 channel.
Figure 8:
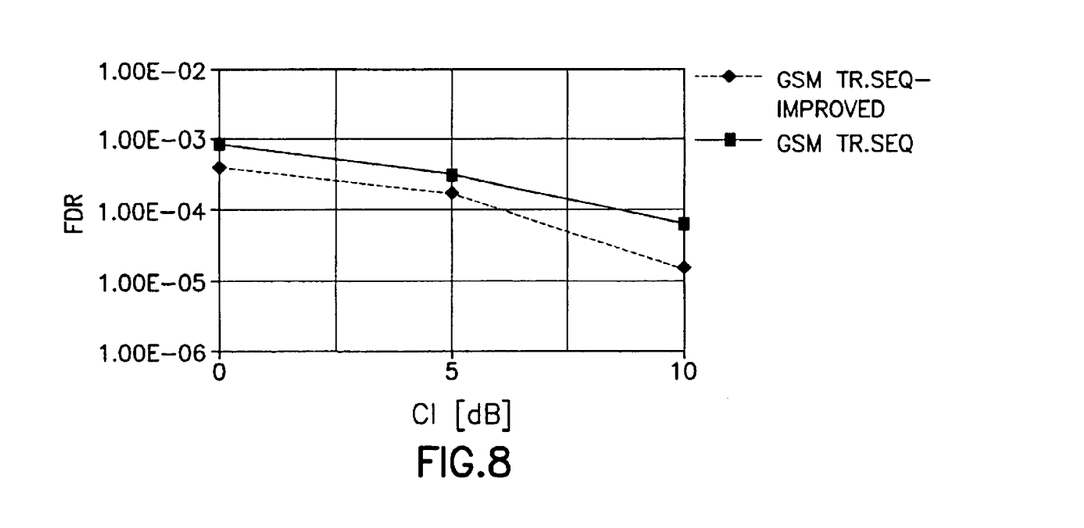
FIG. 8 is a graph showing a simulation of the false detection rate for the plurality of training sequences in the presence of one single interferer, assuming the TU3 channel.
Figure 9:
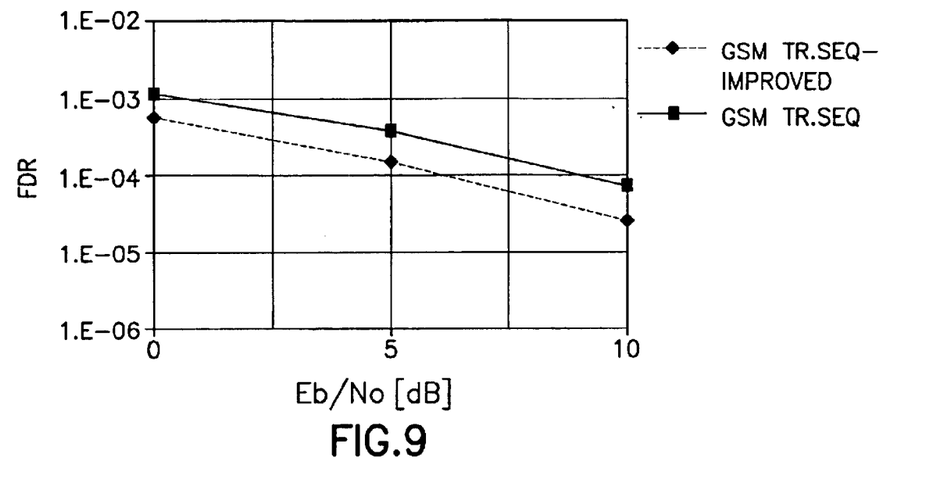
FIG. 9 is a graph showing a simulation of the false detection rate for the plurality of training sequences in the presence of White Gaussian Noise (WGN), assuming a HT100 channel.
Figure 10:
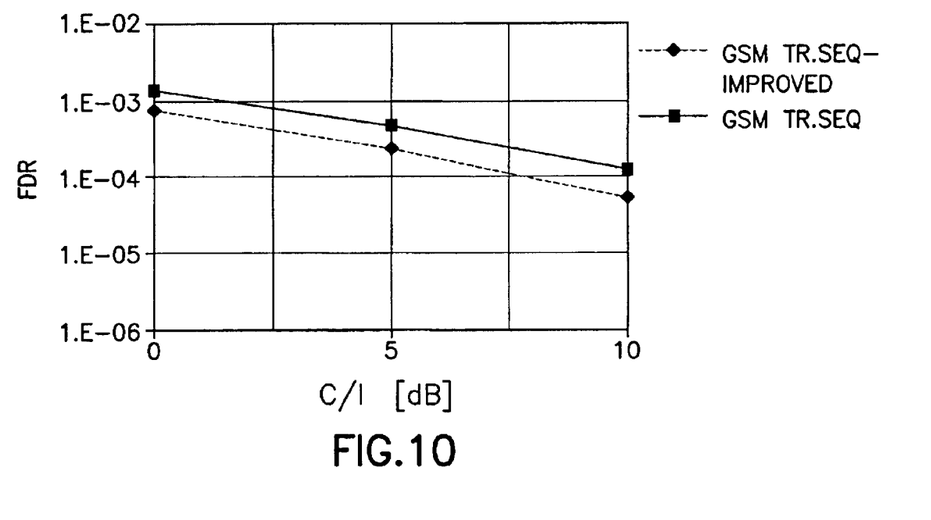
FIG. 10 is a graph that illustrates a degradation ranging from 1 dB to 3 dB, compared to the TU3 channel, that is obtained in a severe environment such as HT100, either with Gaussian Noise or the single interferer.
Figure 11:
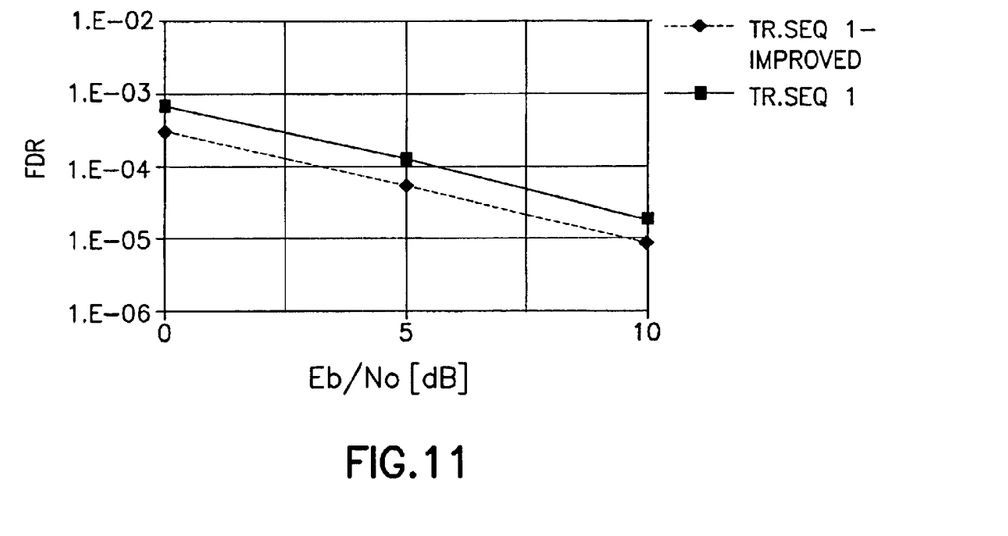
FIG. 11 is a graph that illustrates a simulation of the false detection rate for an improved training sequence, in the TU3 channel with White Gaussian Noise.

FIGS. 5 and 6 show the message error rate when the transmitted training sequence is unknown, versus the reference case where the transmitted training sequence is known, i.e., the conventional GSM training sequence case.

These Figures show that the message error rates differ just slightly from the reference case.

It can be appreciated that the foregoing solution to the problems outlined above readily solves the EGPRS problem in the context of the Packet Channel Request message, and is also backwards compatible with current GPRS specifications. This solution also accommodates future enhancements to the signalling required to implement high performance packet radio services.

The foregoing solution is also low complexity, as it requires that the network side of the wireless link be capable of recognizing only two additional training sequences on the PRACH. On the mobile equipment side, it is only required that the memory 16 be capable of storing the two additional training sequences TS1 and TS2, and that the controller 14 be capable of selecting one of the three stored training sequences when constructing the Packet Channel Request message.

While described above in the context of specific numbers of bits, bit patterns, message types, message fields, numbers of training sequences and the like, it should be realized that these are exemplary of presently preferred embodiments of this invention, and are not intended to be read or construed in a limiting sense upon the practice of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile equipment (ME) in a wireless network, comprising steps of:

providing a mobile equipment-based signalling technique that extends an information carrying capability of a single bit-limited message by providing a plurality of different training sequences selected to have low cross-correlation and high auto-correlation properties;

selecting one of the plurality of training sequences and setting bits of the message in accordance with information to be conveyed from the mobile equipment;

transmitting the message, including the training sequence, from the mobile equipment to a receiver; and detecting the information conveyed by the message based on an interpretation of the message bits in accordance with the particular training sequence that is received with the message.

2. A method as in claim 1, wherein the message is a Packet Channel Request message.

3. A method as in claim 1, wherein the message is an 11-bit Packet Channel Request message, and wherein the mobile equipment is operable for Enhanced General Packet Radio System service.

4. A method for operating a mobile equipment (ME) in a wireless network having Enhanced General Packet Radio System (EGPRS) service capability, comprising steps of:

storing a plurality of training sequences in a memory of the ME, the plurality of training sequences comprising a conventional training sequence (TS_GSM) used with a Packet Channel Request message and at least two additional training sequences (TS1 and TS2);

when preparing to transmit a Packet Channel Request message from the ME, selecting one of the plurality of training sequences and setting bits of the message in accordance with information to be conveyed from the mobile equipment;

transmitting the Packet Channel Request message, including the selected training sequence, from the mobile equipment to a receiver of a base transceiver station (BTS) of the wireless network; and detecting the information conveyed by the message based on an interpretation of the message bits in accordance with the particular selected one of the training sequences that is received with the message.

5. A method as in claim 4, wherein a selection of TS1 indicates one of an EGPRS One Phase Access Request (OPAR), an EGPRS Short Access Request (SAR), or an EGPRS Two Phase Access Request (TPAR) with 8-PSK modulation capability on the uplink, wherein a selection of TS2 indicates one of EGPRS OPAR, SAR, or TPAR with GMSK modulation capability only on the uplink, and wherein a selection of TS_GSM indicates one of GPRS OPAR, SAR or TPAR, or one of a Page Response, Cell Update, Mobility Management Procedure, or Single Block without Temporary Block Flow (TBF) Establishment message content.

6. A method as in claim 4, wherein a bit pattern for TS_GSM is as follows:

(0,1,0,0,1,0,1,1,0,1,1,1,1,1,1,1,0,0,1,1,0,0,1,1,0,1,0,1,0,1,0,0,0,1,1,1,1,0,0,0)

wherein a bit pattern for TS1 is as follows:

(0,1,0,1,0,1,0,0,1,1,1,1,1,0,0,0,1,0,0,0,0,1,1,0,0,0,1,0,1,1,1,1,0,0,1,0,0,1,1,0,1);

and wherein a bit pattern for TS2 is as follows:

(1,1,1,0,1,1,1,1,0,0,1,0,0,1,1,1,0,1,0,1,0,1,1,0,0,0,0,0,0,1,1,0,1,1,0,1,1,1,0,1,1,1).

7. A wireless communications system comprised of a wireless network and at least one mobile equipment (ME) located in a cell of said wireless network, further comprising a memory in said ME for storing a plurality of training sequences, the plurality of training sequences comprising a conventional training sequence (TS_GSM) used with a Packet Channel Request message and at least two additional training sequences (TS1 and TS2); said ME further comprising a controller coupled to said memory for preparing a Packet Channel Request message and for selecting one of the plurality of training sequences and setting bits of the message in accordance with information to be conveyed from the mobile equipment; said ME further comprising a transmitter for transmitting the Packet Channel Request message, including the selected training sequence, to a receiver of the wireless network; and said receiver of said wireless network operating to detect the information conveyed by the Packet Channel Request message based on an interpretation of the message bits in accordance with the particular selected one of the training sequences that is received as a part of the Packet Channel Request message.

8. A wireless communications system as in claim 7, wherein a selection of TS1 indicates one of an EGPRS One Phase Access Request (OPAR), an EGPRS Short Access Request (SAR), or an EGPRS Two Phase Access Request (TPAR) with 8-PSK modulation capability on the uplink, wherein a selection of TS2 indicates one of EGPRS OPAR, SAR, or TPAR with GMSK modulation capability only on the uplink, and wherein a selection of TS_GSM indicates one of GPRS OPAR, SAR or TPAR, or one of a Page Response, Cell Update, Mobility Management Procedure, or Single Block without Temporary Block Flow (TBF) Establishment message content.

9. A wireless communications system as in claim 7, wherein a bit pattern for TS_GSM is as follows:

(0,1,0,0,1,0,1,1,0,1,1,1,1,1,1,1,0,0,1,1,0,0,1,1,0,1,0,1,0,1,0,0,0,1,1,1,1,0,0,0);

wherein a bit pattern for TS1 is as follows:

(0,1,0,1,0,1,0,0,1,1,1,1,1,0,0,0,1,0,0,0,0,1,1,0,0,0,1,0,1,1,1,1,0,0,1,0,0,1,1,0,1);

and wherein a bit pattern for TS2 is as follows:

(1,1,1,0,1,1,1,1,0,0,1,0,0,1,1,1,0,1,0,1,0,1,1,0,0,0,0,0,0,1,1,0,1,1,0,1,1,1,0,1,1,1).

10. A method to establish a temporary block flow (TBF) in an uplink direction from a mobile equipment to a wireless network, comprising steps of:

transmitting a Packet Channel Request message of size 11 bits over a Packet Random Access Channel (PRACH) in an Access Burst (AB), the AB containing a synchronization sequence of size 41 bits;

receiving the AB;

detecting the synchronization sequence as being one of a plurality of possible synchronization sequences; and interpreting the content of the Packet Channel Request message at least partially in accordance with a detected one of the synchronization sequences.

* * * * *